Aug. 23, 1927.
W. M. SHEEHAN
1,640,054
ELECTRIC LOCOMOTIVE CAB UNDERFRAME
Filed Nov. 24, 1924   2 Sheets-Sheet 1
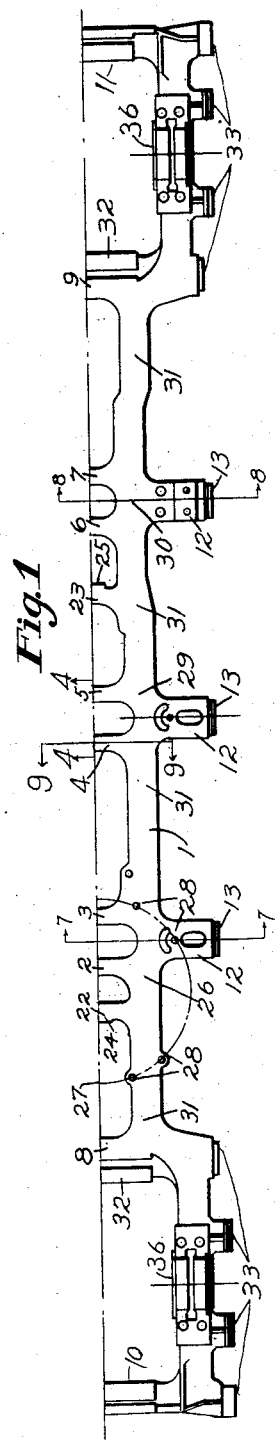
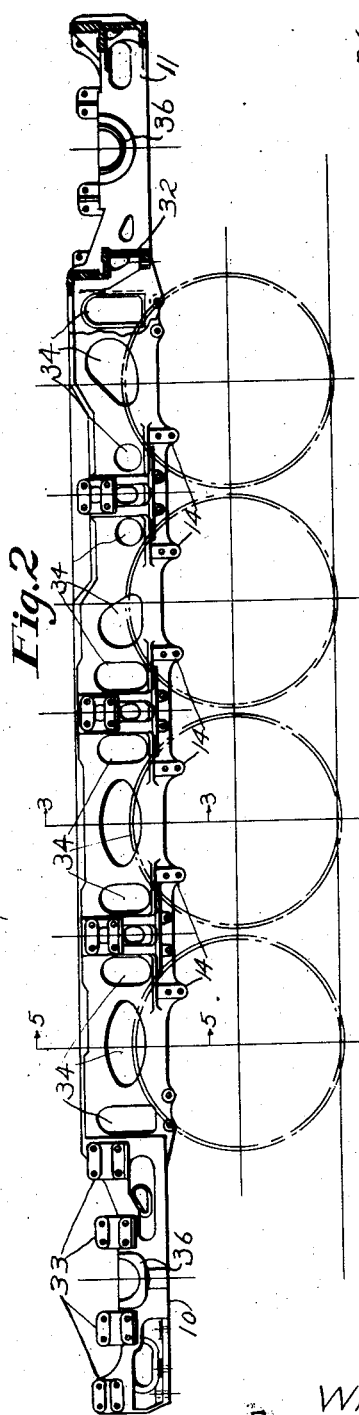
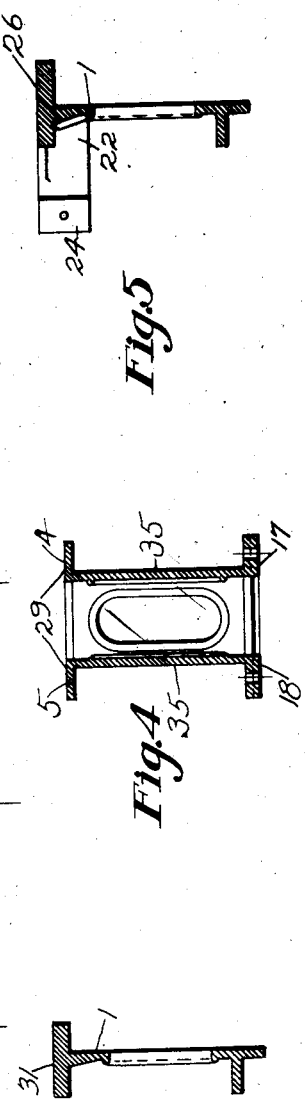
Inventor
William M. Sheehan
By Cornwall, Bedell + James
Att'ys

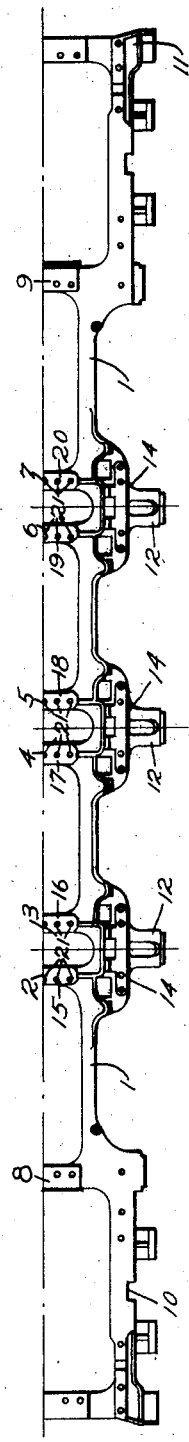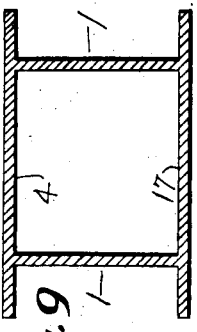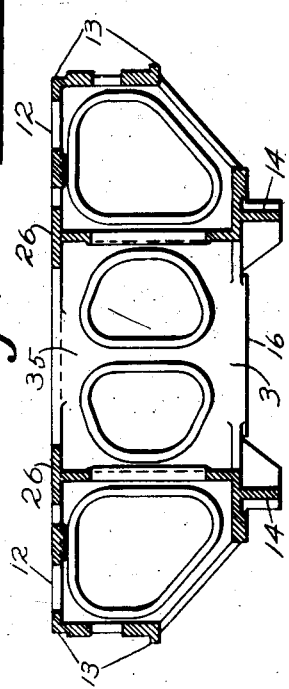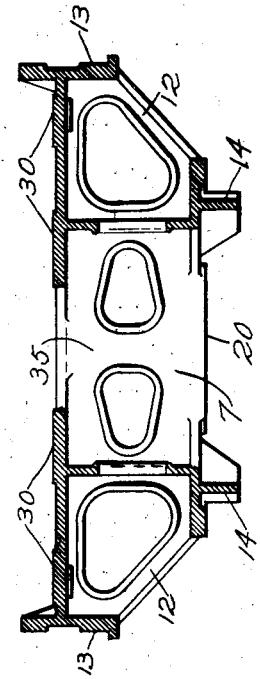

Patented Aug. 23, 1927.

1,640,054

UNITED STATES PATENT OFFICE.

WILLIAM M. SHEEHAN, OF ST. LOUIS, MISSOURI, ASSIGNOR TO COMMONWEALTH STEEL COMPANY, OF ST. LOUIS, MISSOURI, A CORPORATION OF NEW JERSEY.

ELECTRIC-LOCOMOTIVE-CAB UNDERFRAME.

Application filed November 24, 1924. Serial No. 751,891.

My invention relates to electric locomotives and more particularly to the cab underframe which is carried by the truck and which in turn carries the body or cab of the locomotive.

An object of my invention is to provide a one-piece or integral underframe having formed therewith various essential parts which are normally fastened to the frame after it is constructed, or provision for which must be made in the cab.

In the manufacture of fabricated car, truck, tender and locomotive parts, some of these pieces are of such size and shape that if handled after entire or partial assembling in the customary manner, that is, by crane connected at the ends by chains or the like, there is a high percentage of breakage due to the weight and shape of the assembled structure being handled and the manner of lifting it. This liability is eliminated in the use of my improved cab underframe structure, which is formed of a substantially box-shaped girder and which when attached to the balance of truck frame serves as a backbone for the whole. Thus, another object of my invention is to provide a cab underframe sufficiently strong to withstand extraordinary strains of handling before assembly and during partial disassembly as well as the strains during the operation of the vehicle.

With these and other objects in view, my invention consists in certain novel features of construction and arrangement of parts, hereinafter more fully described and claimed, and illustrated in the accompanying drawings, in which—

Figure 1 is a top plan view of one-half of my improved electric locomotive cab underframe.

Figure 2 is a side view of the underframe.

Figure 3 is a cross section taken on line 3—3 of Figure 2.

Figure 4 is a cross section taken on line 4—4 of Figure 1.

Figure 5 is a cross section taken on line 5—5 of Figure 2.

Figure 6 is a bottom view of one-half of the underframe.

Figure 7 is a cross section taken on line 7—7 of Figure 1.

Figure 8 is a cross section taken on line 8—8 of Figure 1.

Figure 9 is a cross section taken on line 9—9 of Figure 1, showing the box-shape of my cab underframe.

The bed of the cab underframe consists substantially of a box-shaped girder having substantial openings in its top and bottom walls producing cross members 2, 3, 4, 5, 6, 7, 8 and 9 connecting the sides 1. Vertical reinforcing ribs 35 are provided in conjunction with each of said cross members. Motor housings 10 and 11 are carried by the underframe and formed therewith. These motor housings extend outwardly and longitudinally away from the underframe at the points of jointure between the sides 1 and the end sill members 8 and 9. Integral journal supports 36 are provided in housings 10 and 11 for the rotor (not shown).

Integral projections 12 extend outwardly from sides 1 at various points and are provided with step-shaped ends 13. These step-shaped ends are adapted to support and be bolted to the locomotive cab which is not shown.

On the underface of the sides 1 located under projections 12 are integral lugs 14 adapted to be connected with the main or truck frame, not shown. The undersurfaces 15, 16, 17, 18, 19 and 20 of cross members 2, 3, 4, 5, 6 and 7, respectively, are finished and provided with bolt holes 21. These surfaces are adapted to be bolted to the main frame cross ties, not shown, and together with lugs 14 form a solid connection between the locomotive cab underframe and the main frame.

22 and 23 are integrally formed transverse members, being brake cylinder supports. The vertical sides 24 and 25 of these members are finished and adapted to carry the brake cylinders. The portion 26 of the top side of the underframe falling within the radius of circle 27 (shown in Figure 1) is a transformer base. Bolt holes 28 are provided in the frame so that a transformer may be fixed thereto. A rheostat base 29 is also provided on the top of the frame on cross members 4 and 5. A phase converter base 30 is provided near cross members 6 and 7. The remaining portions 31 of the top of the underframe are utilized as cab floor supports.

The outer sides 32 of end sill members 8 and 9 are adapted to be utilized as motor housing supports in which case the motor housings 10 and 11 would not be integral parts of the frame but would be fixed to the motor bearing portions.

The shape of the motor housing is such that the longitudinal side is approximately in line with the step-shaped cab supporting members 13 on the outer ends of projections 12. Additional cab supporting members 33 are provided on the motor housing.

The type of cab underframe described is particularly economical in construction and assembly. By forming in one piece all of the above-mentioned parts a much stronger frame is produced than would be if the various parts using the same amount of steel were individually fastened together.

The assembly operation is practically eliminated as far as the underframe is concerned since the frame itself is formed in one piece and provisions are made thereon for a large number of the necessary operating parts. The integral construction of the rheostat transformer and phase converter bases with the underframe insures a solid foundation for these parts at all times. The positive location of the parts permits a better weight distribution throughout the locomotive and enables the builder to strengthen the portion of the frame most apt to receive heavy loads and also enables him to eliminate unnecessary weight.

The form of my cab underframe is intrinsically box-shaped. The projections 12, though integral, are appendages to the true box member as are the motor housings 10 and 11. Openings 34 are provided in the sides 1 for the purpose of decreasing the weight by elimination of metal where it is not necessary for the strength of the frame.

It is obvious that changes in the construction and arrangement of parts of my improved electric locomotive cab underframe may be made and substituted for those herein shown and described, without departing from the nature and scope of my invention.

I claim:

1. An electric locomotive cab underframe comprising a box girder with brake cylinder supports, a rheostat base, a phase converter base, a transformer base, means for connecting said underframe to the locomotive truck, means for connecting said underframe to the cab, and a motor journal support all formed integrally.

2. An electric locomotive cab underframe comprising a box girder with a brake cylinder support, a rheostat base, a phase converter base, a transformer base, means for connecting said underframe to the truck, means for connecting said underframe to the cab, and a motor housing all formed integrally.

3. An integral underframe formed substantially of a box girder, and integral means to which the motor housing is adapted to be attached.

4. An integrally formed cab underframe having an extension at one end thereof adapted to surround a motor, and a motor journal support in said extension.

5. An integrally formed cab underframe having an extension at one end thereof adapted to surround a motor, and a motor rotor support in said extension.

6. A cab underframe formed substantially of a box girder with integral motor housing supports at the ends thereof.

7. An integrally formed cab underframe having a motor housing support formed at its end, said motor housing support being adapted to surround and protect a motor.

8. An underframe comprising a box-shaped girder, depending lugs on said girder adapted to be connected to the locomotive main frame, and a motor housing support formed integrally therewith.

9. An underframe comprising a substantially box-shaped girder with substantial portions of its upper and lower faces cut away, portions of the lower face of said box-shaped girder being adapted to be connected to the locomotive main truck, and a motor housing support formed integrally therewith.

10. An underframe comprising a box-shaped girder having substantial portions of its upper and lower faces cut away, depending lugs on said box-shaped girder adapted to be attached to the locomotive main frame, portions of the underface of said girder being adapted to be attached to the locomotive main frame, and a motor housing support formed integrally therewith.

11. An underframe comprising a box-shaped girder with integral motor housing supports extending longitudinally of said frame beyond the end of said girder.

12. A cab underframe having a flat top, and horizontal projections, said flat top portion being adapted to carry the floor and said horizontal projections to support the body of the cab.

13. An underframe having formed integrally therewith step-shaped cab supporting members.

14. An electric locomotive cab underframe formed substantially of a box girder, portions thereof forming cab floor supporting members.

15. An electric locomotive cab underframe having integrally formed therewith means for rigidly connecting said frame with the locomotive main frame distributed throughout its length.

16. An electric locomotive cab underframe having formed therewith downwardly depending lugs for rigid connection to the locomotive main frame.

17. An electric locomotive cab underframe having formed therewith cross members, said cross members being adapted to be attached to the locomotive main frame.

18. An electric locomotive cab underframe having formed therewith cross members, and downwardly depending lugs, said cross members and lugs being adapted to connect to the locomotive main frame.

19. As a new article of manufacture, an underframe being formed of a single substantially box shaped girder with cut away portions.

20. As a new article of manufacture, an underframe being formed of a single girder, a cross section of said girder throughout its length being substantially box shaped.

In testimony whereof I hereunto affix my signature this 20 day of November, 1924.

WILLIAM M. SHEEHAN.